United States Patent [19]
Fox

[11] Patent Number: 5,850,727
[45] Date of Patent: Dec. 22, 1998

[54] SHIELD STRUCTURE FOR A TRACTOR WITH A REAR MOUNTED HARVESTER

[75] Inventor: Jeffrey Robert Fox, Minburn, Iowa

[73] Assignee: Deere & Company, Moline, Ill.

[21] Appl. No.: 808,146

[22] Filed: Feb. 28, 1997

[51] Int. Cl.[6] .............................. A01D 46/08; A01D 75/18
[52] U.S. Cl. ............................... 56/1; 56/28; 56/DIG. 20; 56/DIG. 24; 460/119
[58] Field of Search .................................. 56/1, 17.4, 28, 56/30, 33, 36, 320.11, DIG. 8, DIG. 9, DIG. 20, DIG. 24, 327.1, 330; 460/119

[56] References Cited

U.S. PATENT DOCUMENTS

| | | | |
|---|---|---|---|
| 4,199,927 | 4/1980 | Craig et al. ................................. | 56/1 X |
| 4,498,277 | 2/1985 | Bennett et al. ................................ | 56/1 |
| 5,251,427 | 10/1993 | Ulschmid et al. ............................. | 56/1 |
| 5,405,292 | 4/1995 | McConnell .............................. | 460/119 |
| 5,454,444 | 10/1995 | Taylor et al. ....................... | 56/327.1 X |
| 5,519,988 | 5/1996 | Copley et al. ............................... | 56/30 |

OTHER PUBLICATIONS

Minneapolis–Moline Modern Machinery, brochure entitled "Cotton Harvestor", 5 pages, dated May 1955, published in the U.S.A.

Primary Examiner—Terry Lee Melius

[57] ABSTRACT

Shielding for a tractor having rear mounted harvesting units such as cotton picker row units includes assemblies mounted on the tractor to allow full axle oscillation and full range of tractor steering while providing crop protection. A first assembly is connected to steering components on the front of the tractor and provides protection of the crop against damage by the front tires. A shield which turns with the steering components is cut to a profile that allows full range of steering as it interacts with a second assembly. The second assembly includes parts rigidly connected directly to the front axle casting of the tractor to define the leading edge of the shielding at the front axle casting. A bevelled front edge and layered construction prevent relatively sharp edges from contacting and damaging the crop. The parts profile assures a full range of steering where the parts interact with the front tire shield. A third assembly, a simple tunnel shield suspended from the rear edge of the second assembly, extends rearwardly under the tractor undercarriage past the rear axle to define the aft end of shielding extending substantially the length of the tractor frame. The third assembly is mounted to both the second assembly and the tractor in such a manner as to allow the front axle to oscillate freely.

20 Claims, 5 Drawing Sheets

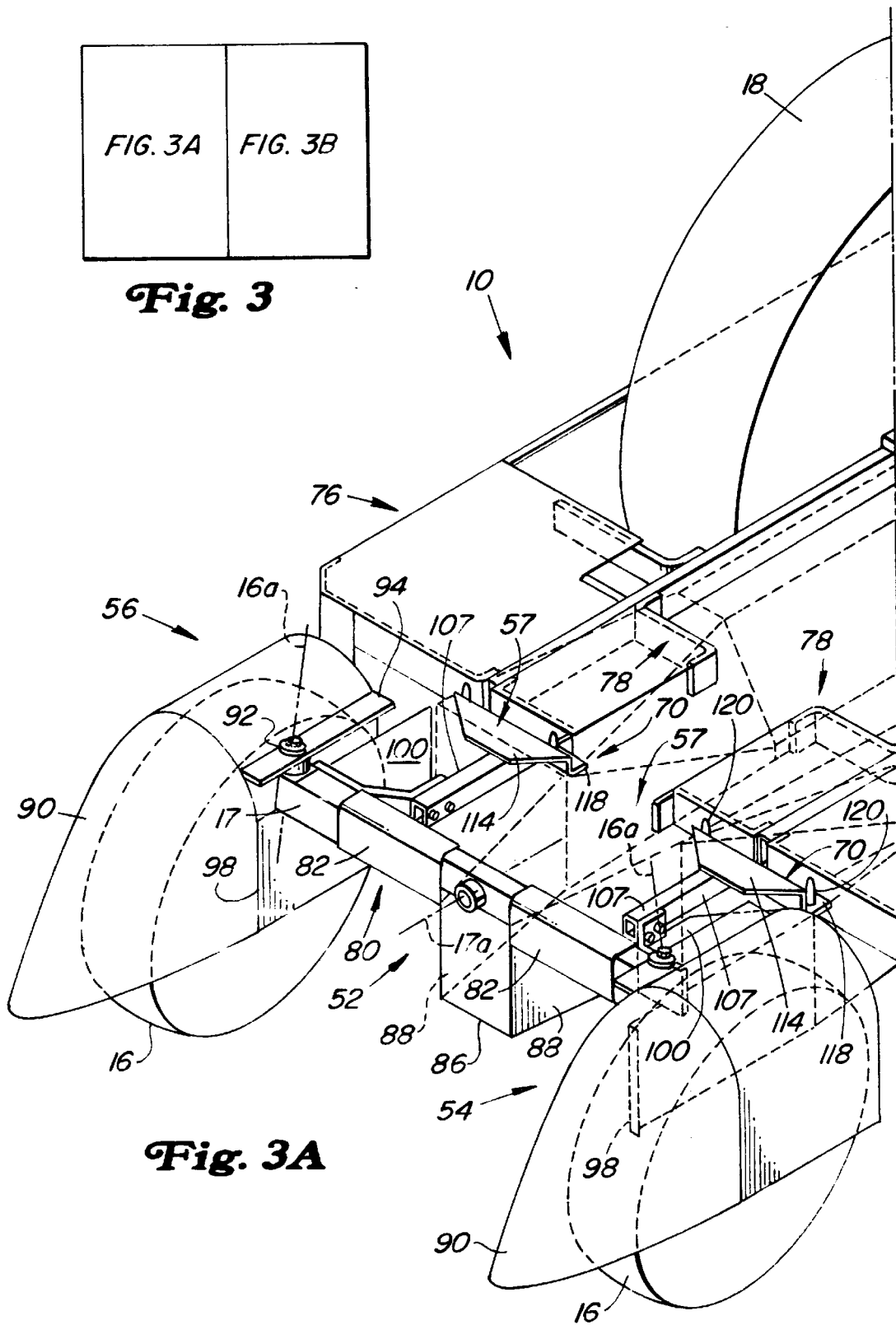

SHIELD STRUCTURE FOR A TRACTOR WITH A REAR MOUNTED HARVESTER

BACKGROUND OF THE INVENTION

1) Field of the Invention

The present invention relates generally to cotton harvesters, and, more specifically, as a shield for a tractor having a rear-mounted cotton harvester or similar implement mounted thereon.

2) Related Art

Tractor mounted cotton harvesters have been designed primarily for use in widely spaced rows of cotton and include one or more picker row units mounted forwardly of the tractor drive wheels. Other types of mounted pickers have included row units supported on the rear of a tractor modified to normally run in the reverse direction. More recently, rear mounted harvesting units have been devised for the rear of a tractor so the tractor can operate in the conventional forward manner. An example of such a unit is shown in U.S. Pat. No. 5,519,988 which is of common ownership with the present application. With such rear mounted units, the unharvested crop must pass around the tractor wheels and under the tractor body, and damage or loss of cotton as a result of the rows of cotton brushing against the tractor is a continuing problem. In narrow row cotton, a skip row pattern of harvesting may be used which increases the problems of cotton loss or damage resulting from crop contact with the tractor since the tractor must make more than one pass over some rows of unharvested cotton.

Providing adequate shielding on the tractor to reduce cotton damage and loss to acceptable levels is a problem since the tractor often has a front axle that oscillates about a fore-and-aft extending axis. The crop must be shielded from damage by the axle without inhibiting full axle oscillation. Another problem arises because of the need to maintain full steering range of the steerable wheels without interference from the shielding. Providing protection for the crops adjacent steerable wheels during turns has also been difficult.

BRIEF SUMMARY OF THE INVENTION

It is therefore an object of the present invention to provide an improved shielding for a tractor mounted cotton harvester. It is a further object to provide such shielding which overcomes the aforementioned problems.

It is another object of the present invention to provide improved shielding for a tractor which supports rear mounted harvesting units. It is a further object to provide such shielding which facilitates forward movement of the tractor over the crop without significant damage to the crop. It is yet another object to provide such shielding which permits full range of tractor axle oscillation and tractor steering. It is still another object to provide shielding which provides protection for the crops adjacent steerable wheels during turns.

It is a further object of the invention to provide improved shielding for a tractor having generally continuous plant protection under the entire frame of the tractor. It is a further object to provide such shielding having portions which interact with each other for such continuous protection while at the same time retaining full tractor maneuverability and axle oscillation.

Shielding for a tractor having rear mounted harvesting units such as cotton picker row units includes assemblies mounted on the tractor to allow full axle oscillation and full range of tractor steering while providing crop protection. The first assembly is connected to steering components on the front of the tractor and provides protection of the crop against damage by the front tires. A shield which turns with the steering components is cut to a profile that allows full range of steering as it interacts with a second assembly.

The second assembly includes parts rigidly connected directly to the front axle casting of the tractor to define the leading surface of the shielding at the front axle casting. The second assembly parts provide a rounded or bevelled front surface and are layered to prevent relatively sharp edges from contacting and damaging the crop. The parts profile assures a full range of steering where the parts interact with the front tire shield.

The third assembly includes a simple tunnel shield suspended from the rear edge of the second assembly and extending rearwardly under the tractor undercarriage past the rear axle to define the aft end of shielding extending substantially the length of the tractor frame. The third assembly is mounted to both the second assembly and the tractor in such a manner as to allow the front axle to oscillate freely.

The shielding allows full range axle oscillation and full range steering while protecting the crop against damage by the tractor. The harvesting units or similar crop processing units can therefore be mounted to the rear of the tractor to perform the harvesting or other function to crops that remain virtually undamaged by the passing tractor. The tractor can also be operated in the normal forward direction of travel.

These and other objects, features and advantages of the present invention will become apparent to one skilled in the art upon reading the following detailed description in view of the drawings.

BRIEF DESCRIPTION OF THE DRAWINGS

FIGS. 3A and 3B are isometric views of the tractor frame and axles showing the shield structure attached thereto.

DETAILED DESCRIPTION OF THE DRAWINGS

Figure 1:
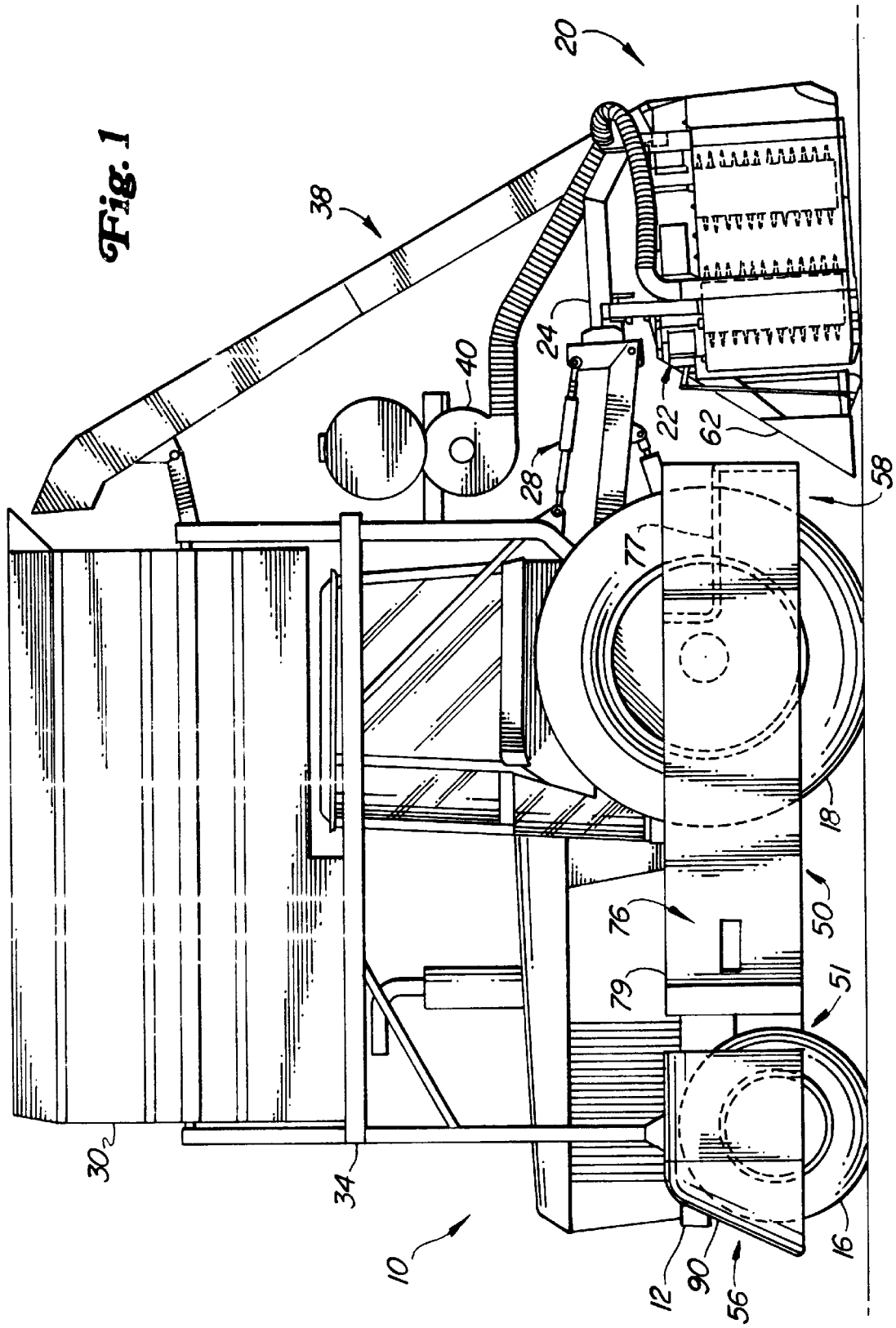
FIG. 1 is a side view of a tractor with a rear mounted harvester and shield structure.
Figure 3B:
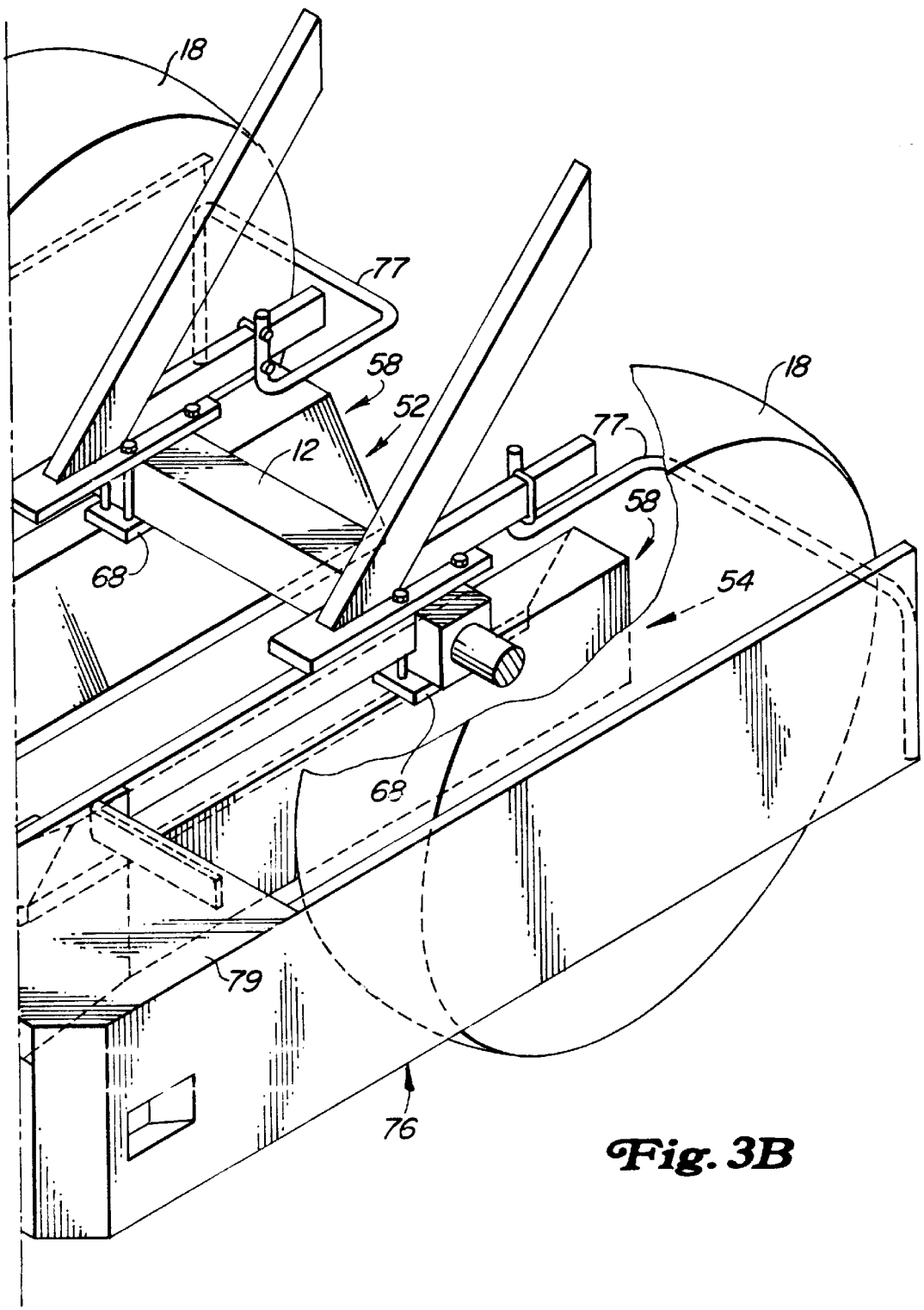

Referring now to FIG. 1, therein is shown a tractor 10 having a fore-and-aft extending main frame 12 supported for forward movement over a field with a crop such as cotton planted in narrowly spaced rows. The fore end of the frame 12 is carried by forward wheels 16 steerable about upright axes 16a (FIG. 3A). The wheels 16 are rotatably mounted on an oscillatable axle 17 rockable about a fore-and-aft axis 17a. The frame 12 is also supported by rear drive wheels 18 aligned with the corresponding wheels 16. Rear-mounted harvester structure 20 connected to the aft end of the tractor main frame 12 includes individual narrow row units 22 transversely spaced on a vertically movable lift implement lift frame 24 carried by fore-and-aft extending hydraulically actuated lift arm structure 28 pivotally connected to the tractor 10. A basket 30 is supported above the tractor 10 by a basket support frame 32 connected to the main frame 12. An air duct system 38 extending between the row units 22 and the upper rear portion of the basket 30 and connected to a fan 40 moves cotton from the row units 22 into the basket 30.

The row units 22 preferably are closely spaced on the lift frame 24 to harvest rows of cotton plants that pass between the drive wheels 18 as the tractor moves in the normal forward direction through the field. However, in some crops with very narrowly spaced rows, one or more of the rows of plants may be skipped on the first pass of the harvester structure 20. To reduce the potential for plant damage and crop loss as the tractor 10 moves through the field, shield structure 50 (FIG. 1) is supported from the tractor main frame 12 and axle 17 and defines crop protecting channels 52 and 54 (FIGS. 2 and 3A) for the rows of plants embraced by the rear drive wheels 18. As shown, a pair of adjacent rows of plants are embraced between the wheels 16 and 18 and protected by the channels 52 and 54. The channels 52 and 54 extend substantially the length of the main frame 12 from the forward wheels 16 to the aft portions of the rear drive wheels 18 and open forwardly of corresponding plant guides 62 for the row units 22 which remove the cotton from the two rows of plants. Alternatively, in very narrowly spaced cotton, one embraced row may be skipped on the first pass of the tractor and harvested on the next pass. The shield structure 50 provides substantially continuous plant protection from a location forwardly of the oscillatable axle 17 to locations at the rear of the drive wheels 18, even as the axle oscillates about the axis 17a and the wheels 16 are turned about the steering axes 16a.

The shield structure 50 includes a forward shield assembly 56 steerable with the wheels 16 and oscillatable with the steerable wheel axle 17. A second or frame shield portion or assembly 57 which interacts with the adjacent assembly 56 is connected to the wheel axle 17 and is oscillatable with the axle 17. The shield portion 57 extends rearwardly from the portion 56 to a location behind the wheels 16 and substantially forward of the wheels 18. A third or simple tunnel shield portion or assembly 58 is supported from the rear of the tractor frame 12 by rear axle-mounted brackets 68 and from the aft end of the second shield portion 57 by an oscillation joint assembly 70 which maintains generally continuous plant protection while permitting relative motion between the tunnel shield assembly 58 and second shield portion 57. The brackets 68 permit some rocking of the aft end of the tunnel shield portion 58 to accommodate movement in the area of the oscillation joint assembly 70.

Side shield assemblies 76 are supported from the tractor frame 12 by aft tubular brackets 77 and by forward frame-mounted support frames 78. The shield assemblies 76 extend forwardly from behind the drive wheels 18 to a location immediately behind the steerable wheels 16 and protect the rows of plants outwardly adjacent the wheels 16 and 18. Horizontal platforms 79 supported by the frames 78 adjacent the tractor engine provide access to the tractor cab area.

The forward shield assembly 56 includes an axle shield assembly 80 fixed to the axle 17 to eliminate sharp edges and provide rounded plant contacting surfaces. The assembly 80 includes a J-shaped metal members 82 extending around the front of the axle 17 and terminate in a pair of generally horizontal axle mounted plates 83 projecting rearwardly from a location under the axle and adjacent the second shield portion 57 (FIG. 4) toward the joint assembly 70. Each member 82 is connected directly to the axle 17 by bolts 84. Divider structure 86 with opposite upright sidewalls 88 extending downwardly from the member 82 guides the rows of plants towards their respective plant channels 52 and 54 on either side of the tractor centerline.

The forward shield assembly 56 also includes wheel fenders 90 supported from the tops of steering spindles 92 by brackets 94 bolted to the spindles which move with the wheels 16 during steering. The fenders 90 extend over the wheels 16 and narrow in the forward direction. The aft extremities of the fenders 90 terminate forwardly of the side shield assemblies 76 and provide a smooth transition for the rows of plants outwardly adjacent the wheels 16 and 18. Fore-and-aft extending, upright sheet metal plant deflectors 98 are supported near the lower, inside portion of each fender 90 and move with the fender as the wheels 16 are steered. The deflectors 98 extend rearwardly and terminate forwardly of the tunnel shield assembly 58. As the wheels 16 are steered, the deflectors 98 move under plates 83 of the metal members 82 and help maintain a continuous channel under the front axle.

Figure 2:
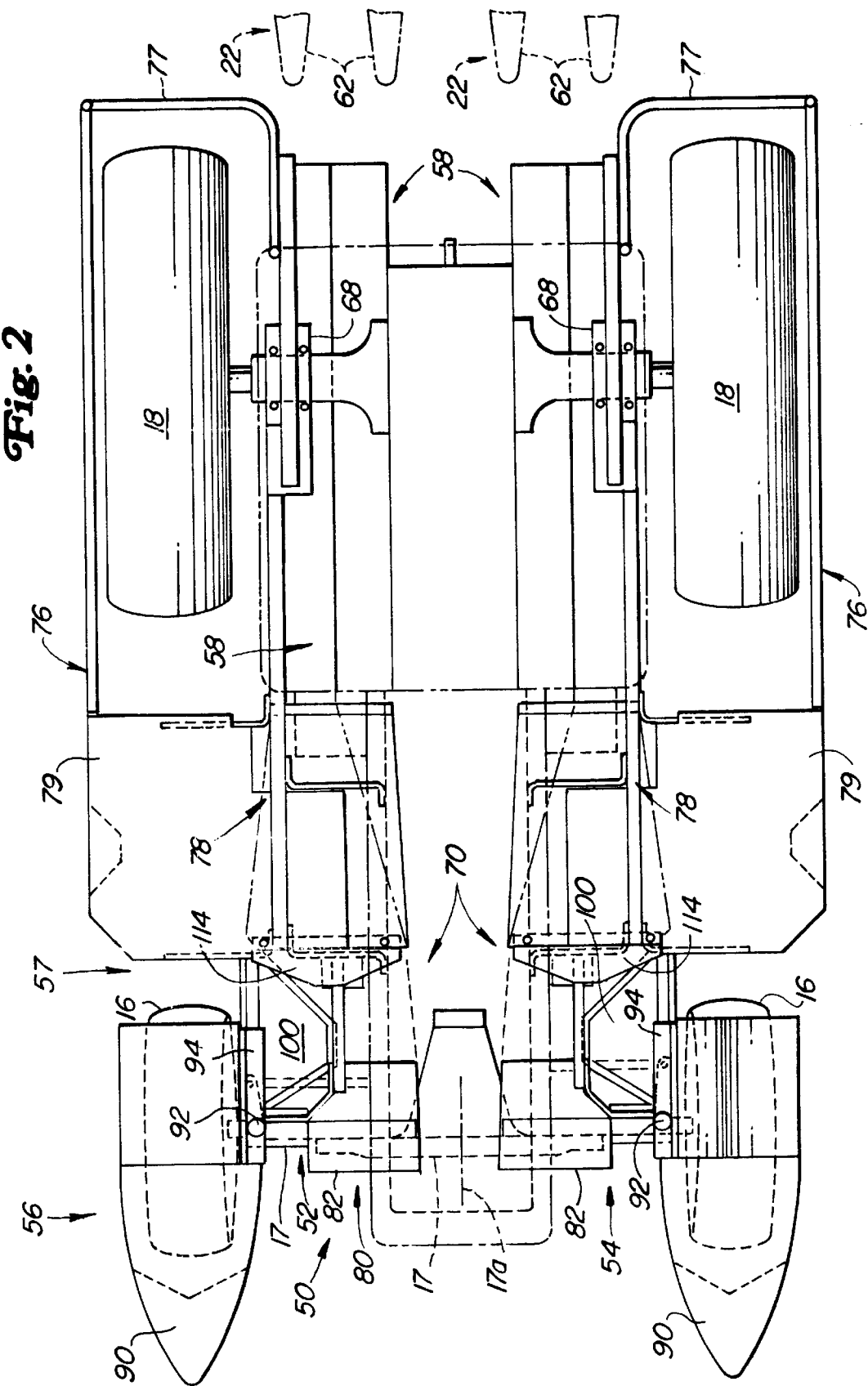
FIG. 2 is a top view of the tractor of FIG. 1 with portions removed to better show the shield structure.
Figure 4:
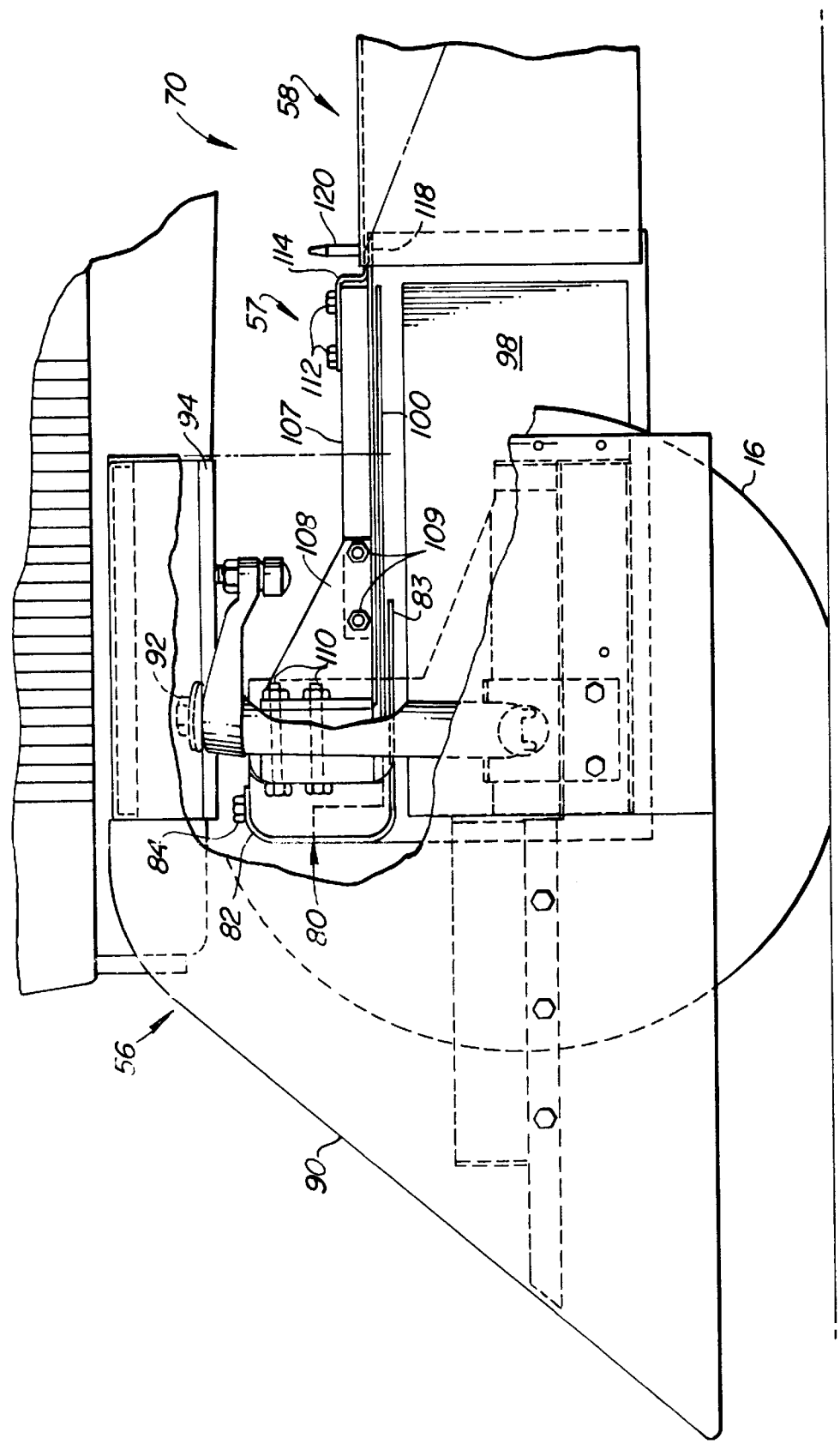
FIG. 4 is an enlarged side view of the front portion of the tractor and attached shield structure with portions broken away to better show details of the shield structure mounting.

Projecting inwardly from the inside rear of the fenders 90 are a pair of generally horizontally extending planar members 100 which, when the wheels 16 are in a small range of steered positions including and near the straight ahead steered position, overlap the corresponding axle mounted plates 83 (FIGS. 2 and 4). The planar members 100 also overlap the shield portion 57 at locations adjacent the oscillation joint assembly 70 in the range of steered positions near the straight ahead steered position so that the top of the plant channels 52 and 54 are generally continuous during normal field operations. As the wheels 16 are turned more sharply either direction during turning, the members 100 still provide plant protection by forming a partial top for the channels 52 in the front axle area.

The shield portion 57 includes a pair of axle mounted supports 107, one on either side of the tractor centerline, offset just above the level of the corresponding member 100 (FIG. 4). Each support 107 includes a forward end fixed by a bracket 108 and bolts 109 and 110 to the front axle 17. The support 107 projects rearwardly to an aft end connected by bolts 112 to an angle bracket 114 with a lower horizontal flange 118 supporting a pair of transversely spaced upright pins 120 to define one part of the oscillation joint assembly 70. As the axle 17 oscillates about the axis 17a, the supports 107 move with the axle. To assure registry of the forward ends of the tunnel shield assembly 58 with the shield portion 57 while permitting the axle to oscillate over its full range, the forward ends of the tops of the assembly 58 are apertured and received over the pins 120. The horizontal flange 118 and the pins 120 support a forward end of the tunnel shield assembly 58 and allow relative motion between the supports 107 and the tunnel shield assembly with the pins 120 moving relative to the apertured portions of the assembly 58 as the axle 17 oscillates. The arrangement of the deflections surfaces, layered or overlapping portions and joints assure that the cotton plants do not encounter sharp edges that can damage the plants and cause cotton loss.

Having described the preferred embodiment, it will become apparent that various modifications can be made without departing from the scope of the invention as defined in the accompanying claims.

I claim:

1. In a tractor having a fore-and-aft extending frame with forward wheels mounted on an axle connected to the frame and movable relative to the frame over a preselected range, and rear drive wheels connected to the frame, the tractor adapted for forward movement over a field wherein crops are planted in parallel rows, harvesting structure supported from the aft end of the frame, and shield structure for protecting the crops as the tractor moves forwardly over the field, the shield structure comprising a forward shield portion located adjacent the movable wheels; and a second shield portion extending rearwardly from the forward shield portion to provide a generally continuous crop deflecting surface from the fore end of the frame to a location behind the axle, wherein the forward shield and second shield portions include adjacent portions maintaining the generally continuous crop deflecting surface as the forward wheels move relative to the frame within the preselected range.

2. The invention as set forth in claim 1 wherein the axle is oscillatable over a range of oscillation angles about a fore-and-aft extending axis, the forward and second shield portions oscillatable with the axle to facilitate full oscillation of the axle over the range of angles without interference between the forward and second shield portions.

3. The invention as set forth in claim 1 wherein the forward wheels are steerable and the forward shield portion includes a steerable portion moving with the forward wheels as the forward wheels are steered.

4. The invention as set forth in claim 2 wherein the forward wheels are steerable and the forward shield portion includes a steerable portion moving with the forward wheels as the forward wheels oscillate and are steered.

5. The invention as set forth in claim 2 including a third elongated shield having a forward end supported adjacent the second shield portion and defining with the forward and second shield portions a generally continuous plant row protecting channel from the fore end to the aft end of the tractor frame, the second shield portion movable relative to the elongated shield to facilitate full oscillation of the axle.

6. The invention as set forth in claim 5 wherein the harvesting structure includes a rear-mounted cotton harvester adapted for removing cotton from at least two rows of plants passing under the frame and between the rear drive wheels as the tractor moves forwardly over the field.

7. In a tractor having a fore-and-aft extending frame with forward steerable wheels mounted on an oscillatable axle and steerable about an upright axis over a preselected steering range, the axle connected to the frame and oscillatable over a range of angles relative to the frame, the tractor including rear drive wheels connected to the frame, and adapted for forward movement over a field wherein crops are planted in parallel rows, rear mounted harvesting structure supported by the frame, and shield structure for protecting the crops as the tractor moves forwardly over the field and comprising a forward shield portion connected to the steerable wheels; and a second shield portion connected to the tractor axle and having a forward end interacting with the forward shield portion and extending rearwardly therefrom to provide a generally continuous crop deflecting surface from the fore end of the frame to a location behind the axle as the tractor moves forwardly over the field, wherein the forward shield and second shield portions include mating portions facilitating full oscillation of the axle over the range of angles without interference between the forward and second shield portions.

8. The invention as set forth in claim 7 wherein the forward shield portion includes a movable section movable with steering of the steerable wheels, and the second shield portion includes a mating section overlapping the movable section over at least part of the steering range of the steerable wheels.

9. The invention as set forth in claim 7 including a third elongated shield supported under the tractor frame and extending to the aft end of the frame from a location adjacent the second shield portion.

10. The invention as set forth in claim 7 wherein the forward and second shield portions comprise plant shields extending from the steerable wheels substantially continuously to a location forwardly of a rear tractor mounted harvester unit.

11. A plant shield for a tractor having a fore-and-aft extending tractor frame with a steerable wheel assembly mounted on an oscillatable axle at one end of the frame, the plant shield comprising:
  a wheel shield connected to the wheel assembly for movement therewith as the assembly is steered;
  a frame shield connected to the oscillatable axle for oscillation therewith;
  wherein the wheel shield and the frame shield move relative to each other as the assembly is steered and as the axle oscillates; and
  wherein the wheel shield and the frame shield include adjacent sections providing a generally continuous plant protection adjacent the wheel assembly and oscillatable axle as the wheel shield and the frame shield move relative to each other.

12. A plant shield for a tractor having a fore-and-aft extending tractor frame with steerable wheel assembly mounted on an oscillatable axle at one end of the frame, the plant shield comprising:
  a wheel shield connected to the wheel assembly for movement therewith as the assembly is steered;
  a frame shield connected to the oscillatable axle for oscillation therewith;
  wherein the wheel shield and the frame shield include adjacent sections providing a generally continuous plant protection adjacent the wheel assembly and oscillatable axle; and
  wherein the wheel shield is connected for pivoting with the wheel assembly about an upright steering axis, and the frame shield includes a fore-and-aft extending shield member fixed to the oscillatable axle defining a portion of the mating sections, the mating sections moving in unison with oscillation of the oscillatable axle.

13. The invention as set forth in claim 12 wherein the mating sections comprise first and second overlapping members, the first overlapping member fixed to the wheel shield for pivoting therewith, and the second overlapping member connected to the frame shield.

14. A plant shield for a tractor having a fore-and-aft extending tractor frame with steerable wheel assembly mounted on an oscillatable axle at one end of the frame, the plant shield comprising:
  a wheel shield connected to the wheel assembly for movement therewith as the assembly is steered;
  a frame shield connected to the oscillatable axle for oscillation therewith;
  wherein the wheel shield and the frame shield include adjacent sections providing a generally continuous plant protection adjacent the wheel assembly and oscillatable axle; and
  a third elongated shield having a connecting end mounted adjacent the frame shield and a distal end located adjacent the end of the tractor frame opposite said one end of the frame, the wheel shield, frame shield and third elongated shield providing substantially continuous crop protection between the fore and the aft ends of the tractor frame.

15. The invention as set forth in claim 14 wherein the tractor frame supports an aft mounted cotton harvester and the wheel shield, frame shield and the elongated shield provide continuous plant protection under the tractor frame for at least one row of cotton plants.

16. The invention as set forth in claim 14 further comprising a fourth side shield connected to the frame outwardly of the tractor frame and the elongated shield, the side shield having a forward end located outwardly and rearwardly of the wheel shield.

17. Plant shield structure for a harvester, the harvester including a fore-and-aft extending frame, forward steerable wheels mounted on an oscillatable front axle at the fore end of the frame and movable both about upright steering axes and a horizontal fore-and-aft extending axle axis, transversely spaced rear drive wheels located at the aft end of the frame for moving the harvester forwardly over a field, and harvester row units mounted from the frame behind the rear drive wheels, the plant shield structure comprising:

a forward shield assembly connected to the harvester for movement with the forward steerable wheels as the steerable wheels move about the steering axes and the axle axis and adapted for positioning between rows of plants to protect the plants from the steerable wheels as the harvester moves forwardly over the field; and a rearward shield assembly connected to the frame and the forward shield assembly and defining with the forward shield assembly at least two plant tunnels extending generally the length of the fore-and-aft extending frame between the rear drive wheels.

18. The invention as set forth in claim 17 wherein the forward shield assembly is connected to and movable with respect to the rearward shield assembly to facilitate full oscillation of the front axle and steering of the steerable wheels while providing generally continuous plant tunnels the length of the tractor frame.

19. The invention as set forth in claim 18 wherein the forward shield assembly includes wheel shields connected to the steerable wheels for movement with the steerable wheels about the steering axes.

20. The invention as set forth in claim 17 including forwardly located crop deflection surfaces supported from the front axle and oscillatable therewith for directing the rows of plants into the plant tunnels.

* * * * *